Oct. 9, 1928.

D. COLE 1,687,082

INTERNAL COMBUSTION ENGINE AND METHOD OF TIMING THE VALVES THEREOF

Original Filed June 19, 1920   3 Sheets-Sheet 1

Witnesses:
W. F. Kilroy
Harry R. White

Inventor
Don Cole
By Brown Boettcher Dunne
Attys

Oct. 9, 1928.
D. COLE
1,687,082
INTERNAL COMBUSTION ENGINE AND METHOD OF TIMING THE VALVES THEREOF
Original Filed June 19, 1920   3 Sheets-Sheet 2
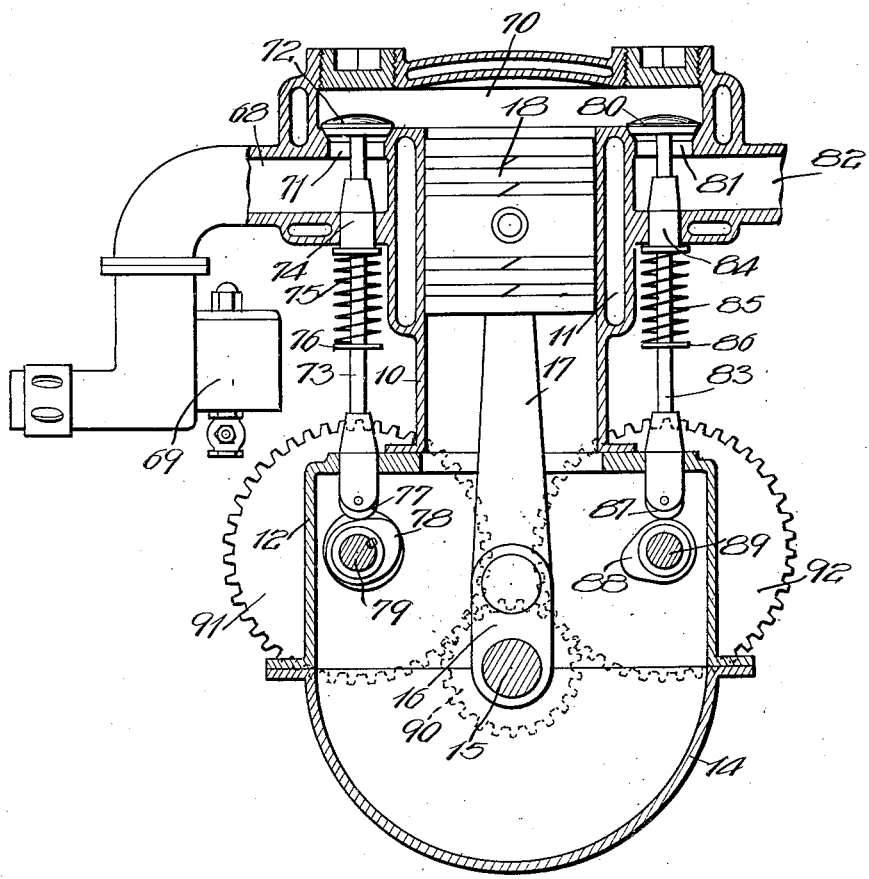

Oct. 9, 1928.
D. COLE
1,687,082
INTERNAL COMBUSTION ENGINE AND METHOD OF TIMING THE VALVES THEREOF
Original Filed June 19, 1920   3 Sheets-Sheet 3
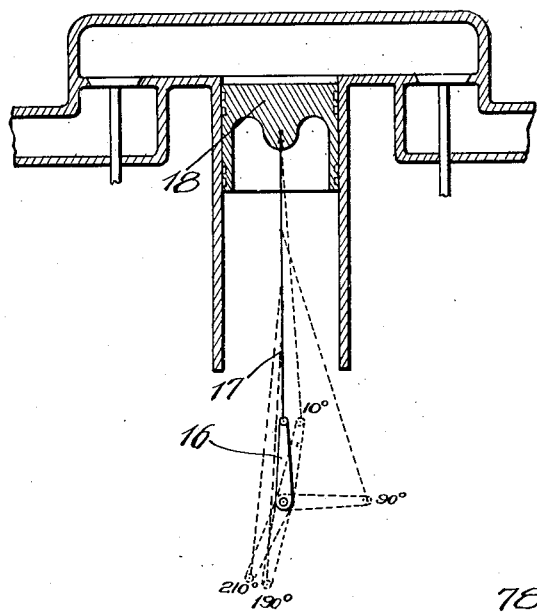
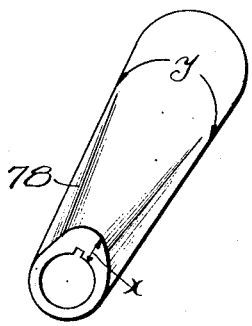
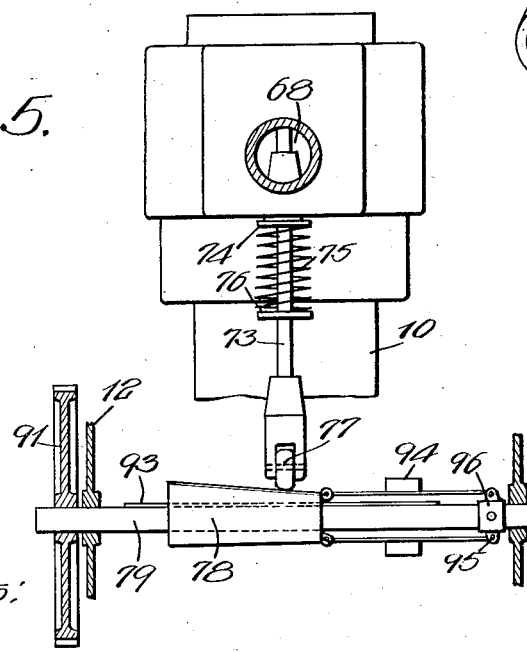
Witnesses:
W. F. Kilroy
Harry R. L. White
Inventor:
Don Cole
By Brown Boettcher Dienner
Attys Patented Oct. 9, 1928.

1,687,082

UNITED STATES PATENT OFFICE.

DON COLE, OF CHICAGO, ILLINOIS, ASSIGNOR OF ONE-HALF TO JOHN A. DIENNER, OF CHICAGO, ILLINOIS.

INTERNAL-COMBUSTION ENGINE AND METHOD OF TIMING THE VALVES THEREOF.

Application filed June 19, 1920, Serial No. 390,077. Renewed November 30, 1923.

This invention relates to internal combustion engines, and more particularly, to an improved means for and method of timing the valves of an internal combustion engine for supplying the combustible mixture to the cylinders thereof.

In my prior applications, Serial Nos. 307,291 and 315,179, methods of controlling the supply of fuel and air to an internal combustion engine are described. Broadly speaking, the invention in application Serial No. 307,291 embodies a system wherein at the beginning of the intake stroke of the piston, a rich mixture of fuel and air is drawn into the cylinder from a conventional type of carburetor through a restricted path, the mixture not containing sufficient air to support combustion. Later in the same stroke, air is admitted for further atomizing the fuel particles and for completing the formation of a combustible mixture. This mixture is then compressed and exploded in the usual fashion.

In the application, Serial No. 315,179, the charge of air and fuel in proper proportion to form a combustible mixture is admitted to the cylinder late in the suction stroke, so that an extremely high vacuum is established in the cylinder prior to opening the inlet valve, serving to thoroughly atomize and vaporize the fuel particles when suddenly introduced thereinto.

In order that an engine involving the foregoing methods of charge forming be efficient in operation, it is necessary that the vacuum or suction in the cylinder should be maintained as constant as practicable throughout all speeds. Referring to application, Serial No. 307,291, and in fact in any internal combustion engine, I have found that the suction established in the cylinder varies from low to high speeds to a considerable degree, this variation ranging from one-half inch of mercury at low speeds to three or three and one-half inches of mercury at high speeds. I have also found that, at high speeds, owing to the inertia of the air admitted later in the suction stroke, a full charge of the air will not reach the cylinder, that is, the necessary volume of air is not obtained. If the engine is built to supply sufficient air at low speeds, at high speeds, a full charge of air will not enter the cylinder, and if the air intake is sufficient for high speeds, the suction developed in the cylinder at low speeds will not be sufficient to feed the fuel, as the air admitted at those speeds practically kills the suction. A similar condition exists in connection with the method employed in application, Serial No. 315,179, the inertia of the fuel and air mixture admitted near the end of the suction stroke rendering the mixture unresponsive at the lower speeds if the engine is built to admit the full charge at high speeds.

As stated above, full vaporization of the fuel and efficient operation of the engine can only be obtained when the suction vacuum in the engine cylinder is maintained constant, or practically constant throughout all engine speeds. If the suction is maintained constant by any means, be that as it may, a constant force will be exerted on the fuel and air throughout all engine speeds and consequently a full and sufficient charge will be supplied to the engine cylinder at all times.

Therefore, the primary aim of the present invention and the method involved therein is to provide an internal combustion engine and a means and methods for supplying fuel thereto which among other things maintains the vacuum in the cylinder practically constant throughout all changes in speeds.

In one embodiment of my invention; namely, that which modifies the method involved in application, Serial No. 307,291, broadly, I regulate the amount of air admitted during the suction stroke, or later in the suction stroke, throughout variation in engine speeds. That is, assuming that at high speeds the valve controlling the air supply is wide open, means is provided for closing this valve as the speed decreases. Thus while at high speeds the depression or usual degree of vacuum exists in the cylinder, namely, three and one-half inches of mercury, as the speed decreases instead of the suction or vacuum decreasing proportionately or otherwise relatively thereto, this suction is maintained practically constant. In this manner, the amount of fuel which is drawn into the engine will be as effectively introduced into the cylinder at high speeds as at low speeds. The degree to which the valve is opened or closed is directly proportional to the speed of the engine, the fuel valve position having nothing whatsoever to do with the position of the air valve. In this embodiment of my invention, referred to broadly in the foregoing, the conventional form of internal combustion engine structure may be employed, there being three valves associated with each cylinder, namely, the rich air and fuel mixture intake valve, the pure or fresh air intake valve and exhaust valve. The pure air intake and the rich air and fuel mixture valves have the usual timing that any other internal combustion engine may have, the fuel intake conduit being restricted for the purpose of speeding up the mixture and for aiding atomization of the heavier particles of fuel contained therein. While the structure employed and described in detail later may be conventional, I modified the same so that the fresh air intake is practically unrestricted, except for a butterfly valve or the like situated therein and controlled by a fly ball governor or the like, so that the amount of air admitted through the pure air intake will be directly proportional to the speed of the engine, or very nearly so. Thus as the engine speed increases, the opening of the butterfly valve to admit air will also be increased and vice versa. As will appear from the detail description later, the amount of air which is admitted to the engine cylinder is not in any way dependent upon the position of the throttle.

In another embodiment of my invention, I accomplish the same results by altering the timing of the inlet valves to compensate for changes in engine speeds, the functioning of the valves being regulated directly in proportion to the changes in engine speeds. The arrangement in this form of the invention is such that the inlet valves for the comustible mixture are maintained open at high speeds to compensate for the increase in suction which would normally take place at such speeds and, therefore, maintain the suction constant and are timed to remain closed a sufficient time at low speeds so as to gain the value of additional piston movement in order that the suction at low speeds will be approximately the same as that at high speeds.

As will be readily appreciated by those skilled in the art, velocity is the principal thing required for proper atomization of fuel, particularly in the atomization of the present quality of fuel obtainable in the market. It has been with the quality of fuel now obtainable for motor car and motor truck use in mind that I have designed the present methods. While I shall describe in detail an arbitrary form of the invention whereby the method desired is evolved at the object attained, I reserve the right to modify this structure when reducing to practice so as to meet with the requirements when building an engine for commercial use. It will be obvious that the method employed is the invention and not necessarily the structure employed to carry out that method.

A more concrete understanding of the method which I employ may be obtained from the following detail description and the accompanying drawings in which:

Figure 3 is a modified form of the invention;

Figure 4 is a semi-diagrammatic view of the same;

Figure 5 is a fragmentary elevational view of the valve governor for the modified form of the invention;

Figure 6 is a diagrammatic view of the valve timing in the device of Figures 4 and 5; and Figure 7 is a perspective view of the valve timing cam.

Figure 1:
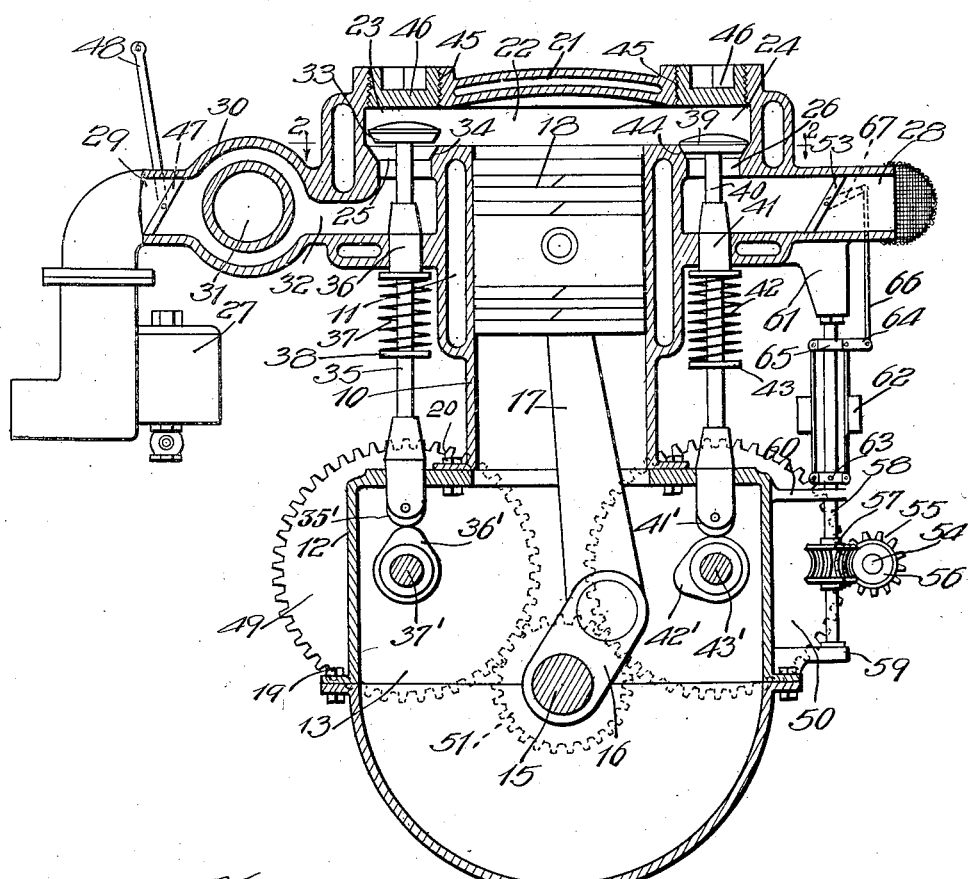
Figure 1 is a vertical section of an internal combustion engine involving the improved method.

An arbitrary construction of internal combustion engine for carrying out my improved method is illustrated in Figure 1 which may or may not be adhered to in reducing the invention to practice. The engine may embody one or more cylinders, all identical in construction, there being but one shown and described. In the engine disclosed, 10 designates the cylinder thereof, the same being provided with the usual conventional form of water jacket 11 and mounted on the upper half section 12 of the crank case 13. The crank case is provided with a trough portion 14. A crank shaft 15 is mounted in suitable bearings within the crank case 13 and is connected through a crank 16 and a connecting rod 17 to the piston 18 movable vertically in said cylinder 10. The crank case sections are joined together by means of bolts 19 and the cylinder 10 is mounted on the upper section 12 of the crank case by means of bolts 20.

The cylinder is provided with a head 21 similarly jacketed to the cylinder, a mixing chamber 22 being formed beneath the head 21. The mixing chamber 22 extends laterally beyond the walls of the cylinder 10 as at 23 and 24 and communicates by means of openings 25 and 26 with the carbureter 27 and pure air inlet 28, respectively. The carbureter 27 is of the usual conventional form set for a very rich mixture, and communicates with the intake opening 25 through a pipe 29, said pipe having an enlarged portion 30 which accommodates the exhaust pipe 31, the inwardly traveling mixture being adapted to contact with the pipe 31. The pipe 29 is integrally cast with the engine cylinder and is provided with a restricted portion 32 which serves to speed up the mixture passing into the cylinder and assist in atomizing the same.

The valves for controlling the inlet for fuel, inlet for air, and exhaust have been illustrated as poppet valves, the inlet valve for fuel being designated 33 and adapted to seat, when closed, at 34. The valve 33 is carried by a vertically movable rod or stem 35 which passes through a suitable bushing 36. The valve 33 is operated by a cam 36' carried by the cam shaft 37' which may be of the conventional form, the valve being opened against the tension of a spring 37 interposed between a collar 38 carried on said stem 35 and said bushing 36. The stem 35 carries a roller 35' which is engaged by the cam 36' for the purpose of reducing friction at this point.

The main air intake valve 39 is carried by valve stem 40 operable in a bushing 41, the valve being opened against the tension of the spring 42 interposed between a collar 43 on said stem 40 and said bushing 41. The valve 39 when closed is adapted to seat at 44.

The valve stem 40 projects into the crank case and carries a roller 41' engageable with a cam 42' mounted on a cam shaft 43' similar to the cam shaft 37' described hereinbefore.

A pair of hand-holes 45—45 are provided above the valves 33 and 39, said opening 45 being closed by plugs 46—46, said plugs having suitable recesses therein to accommodate a wrench or the like.

A conventional type of throttle valve 47 is disposed in the intake pipe 29 and is manually operable from any convenient point by means of a lever 48.

The cam shaft 37' receives motion through a gear 49, and the cam shaft 43' receives motion through a gear 50, said gears 49 and 50 meshing with a pinion or smaller gear 51 mounted on the crank shaft, the ratio of gearing being suitable for giving the proper timing to the valves 33 and 39.

Figure 2:
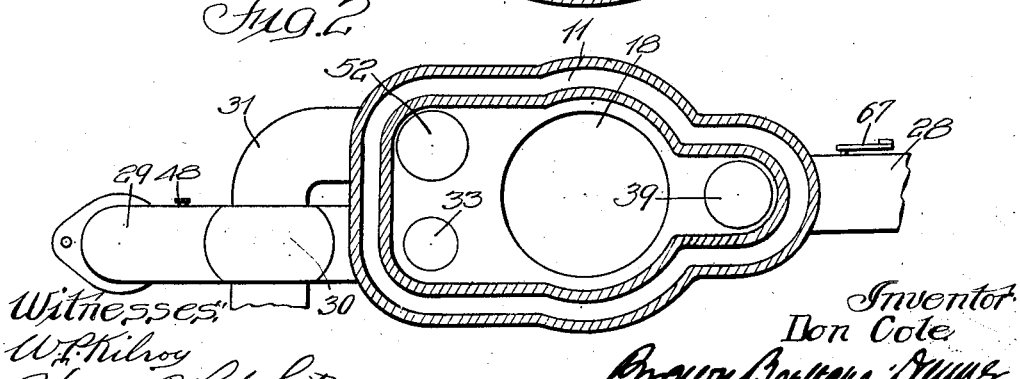
Figure 2 is a horizontal section taken on the line 2—2 of Figure 1 looking in the direction of the arrows.

As shown in Figure 2, an exhaust valve 52 is arranged in the chamber 23, said chamber being enlarged especially to accommodate both the valve 33 and said valve 52. The exhaust valve 52 is operable in any suitable manner, so that the same is opened at the end of the stroke to permit escape of the gases after an explosion takes place. This point of opening will be described presently.

The method involved in this form of the invention, for maintaining constant vacuum in the engine cylinder, is accomplished by means of an auxiliary air valve, which controls the amount of air admitted through the intake 28 throughout changes in engine speeds. This valve may be of the butterfly type and is designated 53. The mechanism which I have devised for controlling the valve 53 comprises preferably a countershaft 54 driven by a pinion 55 which meshes with the gear 50, a worm 56 transmitting motion from the shaft 54 to a worm-gear 57 carried by the governor shaft 58, mounted in bearings 59, 60 and 61. This governor shaft carries a ball governor 62, the governor being anchored at 63 to said shaft 58, an arm 64 is carried by the movable collar 65 from the governor and is pivotally connected to a link 66 which is in turn connected to an operating lever 67 on the shaft of the valve 53. It will be obvious that the degree to which the valve 53 is opened is solely dependent upon the speed of the engine, the increases and decreases in the speed of the engine actuating the governor to raise and lower the arm 64 and consequently close and open the valve 53.

For the foregoing, it will be be apparent that as the speed of the engine increases, the governor will tend to open the air valve 53 to a greater degree admitting more air to compensate for the increased velocity and consequent increase in vacuum in the engine cylinder. Thus, this vacuum is maintained constant throughout all engine speeds. The timing of the valves 33 and 39 may be such that the piston may pass through 90° of the suction stroke prior to admission of air, or the timing may be standard. In the present instance the valve is operated standard timing.

Referring now to the modified form of my invention illustrated in Figure 3, the engine embodied therein is provided with a cylinder 10, a water-jacket 11, a crank case 12, these parts being similar to the structure illustrated in Figure 1 with a few modifications which will be pointed out as this description proceeds. The reference characters 14, 15, 16, 17 and 18 have been applied to similar parts to those illustrated in Figure 1.

This form of the engine is modified in that a fuel inlet 68 is provided through which a combustible mixture is admitted from a standard type of carbureter 69. The passage 68 communicates with the compression and explosion chamber 70 through a port 71 controlled by a poppet valve 72 carried on a valve stem 73, said valve stem passing through a suitable bushing 74 in the wall of the passageway 68 and downwardly into the crank case 12. The valve 72 is maintained normally on its seat by means of a spring 75 interposed between the bushings 74 and a collar 76 carried by the valve stem. The lower end of the valve stem 73 carries a roller 77 which is adapted to be engaged by a cam 78 carried on a cam shaft 79, this cam being of a peculiar construction described in detail later.

An exhaust valve 80 is provided which closes the port 81 communicating with the exhaust pipe 82, said valve 80 being carried on a valve stem 83, the latter passing through a suitable bushing 84 and the valve being maintained normally on its seat by means of a coil spring 85 interposed between the bushing 84 and a collar 86 carried by said valve stem. The lower end of the valve stem extends through the top of the crank case and is provided with a roller 87 which is adapted to engage a suitable cam 88 carried on a cam shaft 89, the latter shaft being turned for operation as will be described presently. Motion is transmitted from the crank shaft 15 to the cam shafts 79 and 89 by means of a pinion 90 carried on the crank shaft, said pinion meshing with gears 91 and 92 carried by said cam shafts 79 and 89 respectively.

Referring now to the means for controlling the timing of the valve 72, reference may be had to Figure 5 wherein the cam 78 is shown in side elevation. It will be seen that the cam is elongated and tapers throughout its length, the cam being keyed to the shaft 79 by means of a key member 93, said key member being considerably longer than the cam so that the latter may slide upon the shaft 79 and at the same time turn with the shaft. The cam 78 is reciprocated upon the shaft 79 by means of a fly ball governor 94 anchored at 95 to a collar 96 secured to and rotating with said shaft 79. The governor 94 is set so that as the speed of the engine increases, the cam 78 will be moved along the shaft 79 to the right bringing the larger portion of the cam under the valve stem 73 and, therefore, increasing the stroke of the valve and compensating for the speed of the engine. Thus, at low speeds, the valve is opened for a certain length of time sufficient to permit a full charge of combustible mixture to enter the cylinder. As this speed increases instead of the valve increasing its speed of movement with the engine it is somewhat retarded in action, so as to permit a full charge to enter the cylinder at high speeds.

Upon reference to Figure 7, it will be noted that the valve timing cam 78 is constructed so that it increases its size both in the size of the heel X of the cam and in the diameter Y' of the cam, this ratio being, of course, varied for different timings desired.

Referring now to the semi-diagrammatic view of Figure 4, the timing of the valve 72 is such that when the crank 16 reaches 90° on the downward or suction stroke, the valve 72 will be opened, and the combustible mixture formed by the carbureter 69 will rush into the cylinder in response to the suction, (about three inches of mercury) and will be thoroughly atomized in the cylinder. As the crank continues to complete the suction stroke and the same reaches 195°, the valve 72 closes and the compression stroke takes place. As the speed of the engine increases, the time of opening of the valve 72 is advanced so that the suction developed in the cylinder, which at high speeds would be greater than at low in a normally timed valve mechanism, is maintained constant because the opening of the valve 72 is advanced to open at about 10° in the suction stroke due to the cam 78 moving along the shaft 79 in response to the action of the governor 94. The closing of the valve 72 is also altered, the same being retarded to about 210°. I have found it possible to permit the valve 72 to remain open after the crank has passed the lower center or 180° as the mixture possess momentum and this also permits of a packing of the charge in the cylinder.

In Figure 6, a complete working cycle of the engine illustrated in Figure 3 is diagrammatically shown. In this diagram at low speeds the fuel intake valve 72 opens at 90° and closes at 195°, and as the speed of the engine increases, the valve 72 in response to the governor action opens at 10° and closes at 210°. The timing of the exhaust valve is the same at all times, that is, exhaust valve opens at 495 and closes at top center or 720°. The degrees given have been indicated on a spiral circle progressively.

Thus it will seen that a constant suction is maintained in the engine cylinder throughout all ranges of speed, thus making it possible to use a simple carbureter and depending practically entirely upon the atomizing effect of the vacuum in the engine cylinder for vaporizing the fuel. As explained, the exhaust valve remains open from 495° to 720° thus permitting the exploded gases to escape from the cylinder just before the crank reaches the lower center and said exhaust valve remaining open a sufficient time to permit of scavenging of the cylinder.

As pointed out hereinbefore, the important feature of this invention is the maintenance of a constant vacuum in the engine cylinder. With this in mind, it will be clear that to maintain the suction constant will obviate the necessity of designing and using complicated charge forming devices for compensating for the changes in engine suction. I find that the charge forming may be accomplished without the use of these complicated devices in an engine embodying my improved method of charge introducing and forming.

While I have described a specific embodiment of the invention, I do not limit myself to the details thereof, except in so far as the scope of the claims may so limit the same, but reserve the right to make changes therein which do not depart from the spirit and scope of the invention.

I claim:

1. In an internal combustion engine, a cylinder, a piston therein adapted to establish a relatively high vacuum on the suction stroke for sucking fuel into the cylinder, intake means for supplying air at atmospheric pressure and fuel in a rich mixture, an auxiliary air valve for admitting additional air at atmospheric pressure, valve means controlling the said auxiliary air valve, and governing means associated with the engine for controlling the degree of opening of said valve means to compensate for changes in engine speeds and maintain the vacuum constant in said cylinder.

2. In an internal combustion engine, a cylinder, a piston therein adapted to establish a relatively high vacuum on the suction stroke, a carbureter supplying air and fuel in a rich mixture, a fuel inlet, a main air inlet, valves controlling the fuel and air inlets, a butterfly valve controlling the air intake, and a governor for controlling the degree of opening of said butterfly valve to compensate for changes in engine speeds and maintain the vacuum constant in said cylinder.

3. In an internal combustion engine, a cylinder, a piston therein for establishing a vacuum on the suction stroke for sucking fuel into the cylinder, a carburetor supplying air and fuel in a rich mixture, a fuel inlet, a main air inlet for supplying air at atmospheric pressure to the cylinder, valves controlling the fuel and air inlets, valve mechanism controlling the air intake, and governing means for controlling the degree of opening of said valve mechanism to compensate for changes in engine speeds and maintain the vacuum constant in said cylinder thus causing a proper amount of fuel to be sucked into the cylinder.

4. In an internal combustion engine, a cylinder, a piston therein for establishing a vacuum on the suction stroke to cause fuel to be sucked into the cylinder, a first means for supplying air and fuel in a rich mixture to the cylinder, a second means for separately introducing a charge of atmospheric air into the vacuum in said cylinder to form a combustible mixture, and means for varying independently of the first means the amount of air admitted by the second means into the cylinder throughout changes in engine speeds to maintain the vacuum established in said cylinder substantially constant.

5. The method of supplying a charge to an internal combustion engine including a cylinder which consists in establishing a vacuum in the cylinder during the intake stroke to cause fuel to be sucked into the cylinder, admitting air and fuel in a rich mixture into the cylinder, introducing a charge of atmospheric air into the vacuum in the said cylinder to form a combustible mixture, and controlling the introduction of air into the cylinder independently of the admitting of the rich mixture in accordance with changes in engine speed to maintain the vacuum established in said cylinder substantially constant.

In witness whereof I hereunto subscribe my name this 7th day of June, 1920.

DON COLE.